United States Patent Office 3,492,544
Patented Jan. 27, 1970

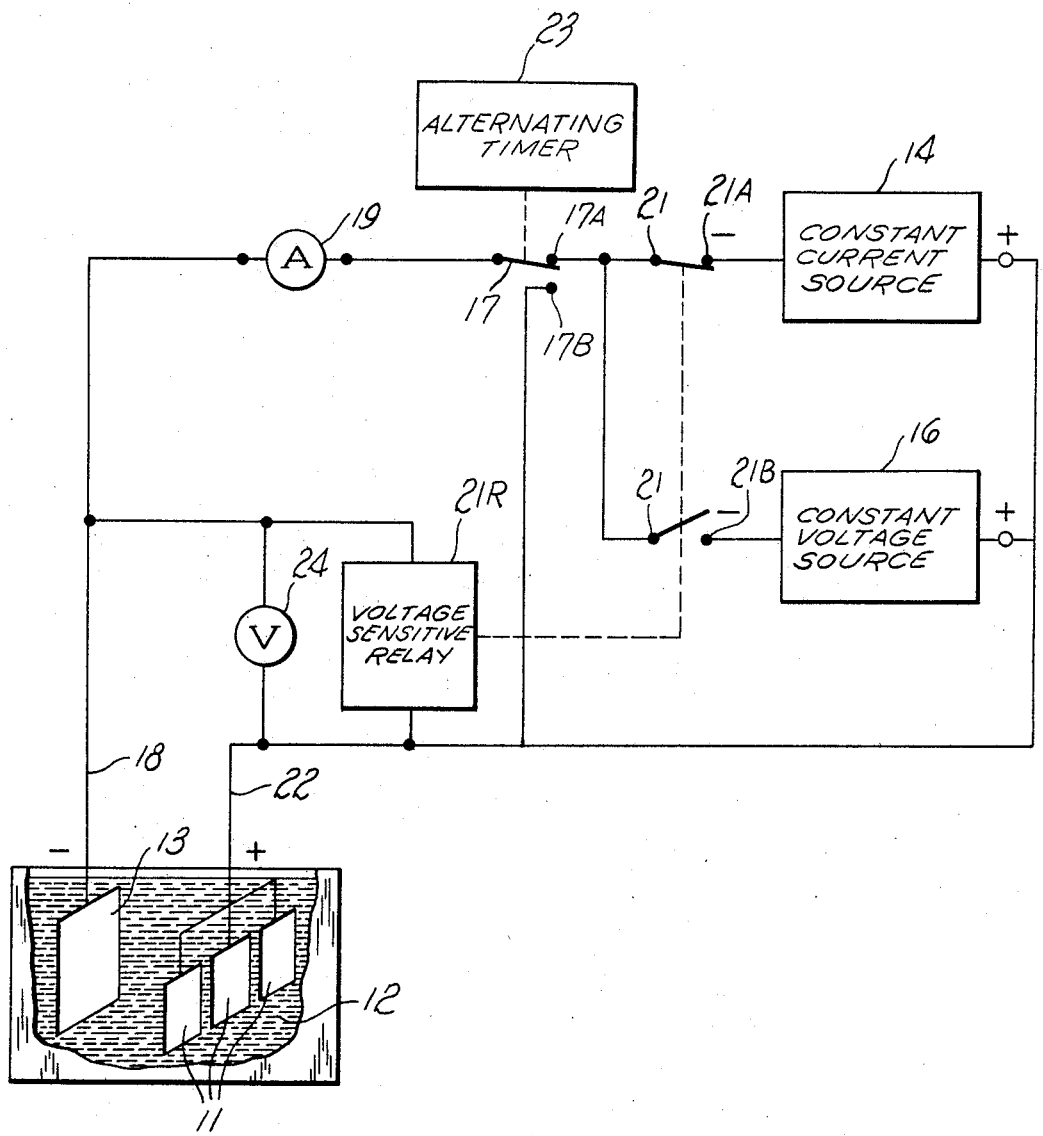

3,492,544
PULSING METHOD FOR ELECTROCHEMI-
CALLY FORMING A FILM ON A METAL
AND PRODUCT OF THE METHOD
Bruno J. Falanga, Lawrence, Mass., assignor to Western
Electric Company, Incorporated, New York, N.Y., a
corporation of New York
Filed Oct. 19, 1967, Ser. No. 676,588
Int. Cl. H01g 9/00, 13/00
U.S. Cl. 317—230　　　　　　　　　　　　　　8 Claims

ABSTRACT OF THE DISCLOSURE

A method of forming an anodized film on a tantalum pellet wherein there is applied between the anodic pellet and a cathode in an electrolyte first a direct current at constant amperage and continuously increasing voltage, next a potential of constant voltage, then a series of short intermittent voltage pulses and finally a potential of constant voltage. During the pulsing steps, surface gaseous bubbles are redissolved in the electrolyte and impurities contained in the anodized film are burned out.

Background of the invention

This invention relates to a method of forming a film on tht surface of a metal and, more particularly, to a method of anodizing and the product of such method.

A known method of electrochemical film forming on metals, such as tantalum, involves the steps of first applying a direct current of constant amperage between the metal, connected as an anode, and a cathode while the potential difference thereacross increases and, thereafter, holding the potential difference constant to form a film on the anode. This method when employed to form dielectric films, such as an oxide layer for use in solid electrolyte capacitors, normally results in the production of capacitors having undesirably high leakage current values. Such result is due both to the presence of impurities in films produced by this method and to the presence of areas of relatively small film thickness caused by the formation of gas bubbles during film production. One partially successful method of reducing leakage current values in such capacitors has been to provide as an additional part of the electrochemical process a series of steps, usually performed at elevated temperatures, wherein the electrodes are idled for periods of from several minutes to several hours betwen periods during which a constant potential is applied across the electrodes until the current falls off to a predetermined value. This series of alternated idling and forming voltage application steps, lasting for relatively long time periods of differing duration, provides a method of electrochemical treatment which produces somewhat improved electrodes. The relatively long idling periods extend the time necessary for forming dielectric films. A necessity for treatment at elevated temperatures to produce best results is also characteristic of this method.

Summary of the invention

An object of the invention is to provide a new and improved method for producing a film on the surface of a metal.

According to the process of the invention, an anode of tantalum or other metal in an electrolyte bath also containing a cathode is subjected to a voltage buildup and then a constant voltage. Next, a series of intermittent, relatively short voltage pulses are applied across the anode and a cathode, the pulses lasting for from a fraction of a second to several seconds each. Interspersed between the short voltage pulses, the anode and cathode are short circuited by electrically connecting them together externally of the electrolyte solution, also for from a fraction of a second to several seconds. The pulsing may occur at ambient temperature. An extremely high energy concentration in the vicinity of any impurity formations during the pulsing step tends to burn out electrically any impurities in the anode. Any surface or included gas bubbles fromed during initial constant voltage phase are redissolved into the electrolyte betwen the short voltage pulses or burst by the voltage pulses. A constant voltage final phase follows the pulsing treatment. A formation of a dielectric film, such as tantalum pentoxide, substantially free of impurities and gas bubbles is produced during this final phase. High quality tantalum capacitor electrodes having relatively low leakage current characteristics have been formed by this process. These new and improved electrodes, produced by the method of the invention, also form a part of the invention.

Brief description of the drawing

The drawing illustrates an apparatus for performing the method of the invention.

Description of the preferred embodiment

Referring to the drawing, a metal 11 to be anodized is supported in an electrolyte bath 12. As shown, several plates or pellets of the metal 11 may be immersed in the bath to be treated simultaneously. The metal may be any valve metal, such as tantalum or aluminum. A cathode 13 is also located in the electrolyte bath. The cathode may be made of tantalum pentoxide. A direct current power supply, consisting of an adjustable source 14 of constant amperage and an adjustable source 16 of constant voltage, may be used. The metal 11 is rendered anodic with respect to the cathode.

An exemplary anodizing circuit is shown in the drawing. A switch 17 has one of its terminals coupled to the cathode 13 through a line 18 which includes an ammeter 19. The switch 17 may be manually operated to couple the line 18 in alternating manner to a switch 21, as shown in the drawing, or to a line 22 from the anodic metal 11 to the positive terminal of each of the voltage sources 14 and 16. Alternatively, a conventional alternating timer 23 may be energized from a source (not shown) to operate the switch 17 in an alternating "on-off" manner between the two described positions, the timer 23 preferably having independently adjustable "time on" and "time off" intervals. A first terminal 21A of the switch 21 constitutes the negative terminal of the constant amperage source 14. A second terminal 21B of the switch 21 constitutes the negative terminal of the constant voltage source 16. A voltmeter 24 and a conventional voltage sensitive relay 21R are coupled in parallel across the lines 18 and 22. The voltage sensitive relay is operable upon a predetermined voltage building up across the lines 18 and 22 to operate the switch 21 from an initial condition, wherein the constant current source 14 is coupled to the switch 17 as shown in the drawing, to a second condition wherein the constant voltage source 16 is coupled to the switch 17. This second condition is maintained independently of the voltage which may thereafter appear across the lines 18 and 22 until the switch 21 is manually reset to its initial condition. The voltage sensitive relay 21R preferably is present to operate at a voltage equal to that to which the constant voltage source 16 is adjusted.

In the practice of the method, a direct current is first applied between the anodic metal 11 and the cathode 13 at a predetermined constant amperage for a period of several minutes. Such application occurs with the switches 17 and 21 maintained in initial positions thereof, shown in the figure, coupling the negative terminal of the constant amperage source 14 with the cathode 13. During this period, the potential across the anodic metal 11 and the cathode 13 increases linearly with time to maintain the predetermined amperage as an oxide film forms and thickens, resulting in an increase in film resistance as the voltage approaches a predetermined level, normally selected to be equal to the voltage to which the constant voltage source 16 is adjusted.

According to the next step of the method, a constant potential difference is applied between the metal anode and the cathode by operating the switch 21 to the second condition thereof to couple a terminal 17A of the switch 17 to the negative terminal of the constant voltage source 16. The switch 21 is operated to the second condition thereof by the voltage across the lines 18 and 22 effecting operation of the voltage sensitive relay 21R, terminating the first step and starting the second. Alternatively, an operator observing the voltmeter 24 could manually operate the switch 21 to the second condition thereof. In either event, the voltage applied by the source 16 during the second step is equal to that present across the anodic metal 11 and the cathode 13 at the end of the first step. This constant potential application is maintained for a period of from several minutes to several hours.

Next, relatively short bursts of voltage are intermittently pulsed between the anodic metal 11 and the cathode 13 in the following manner. A constant potential from the adjustable source 16 is applied across the lines 18 and 22 for a short time period of from a fraction of a second to several seconds. This constant potential pulse may be of a magnitude equal to or less than that applied during the previous constant voltage phase of the process. Should the previous constant potential be exceeded, the desired capacitance would also be exceeded, since capacitance is a function of the forming voltage which determines the film thickness. The pulsing potential is ordinarily equal to the potential applied during the preceding step, both being derived from the constant voltage source 16, which is preferably not reset between steps. After the application of each constant potential pulse, the anodic metal 11 and the cathode 13 are maintained at the same potential for a relatively short time period also of from a fraction of a second to several seconds. This alternate application first of a short pulse of constant potential difference and then of zero potential difference is repeated for a period of from several minutes to several hours. The timer 23 is energized to carry out this pulsing phase of the process, the timer operating the switch 17 cyclically between its terminals, while the switch 21 is held closed across the terminal 21B. Alternately, a manual operator or known mechanical devices may be used to operate the switch 17 cyclically in the required manner. The switch 17 first connects the line 18 from the cathode first to the negative side of the constant voltage source 16 through the terminal 17A, providing a pulse of constant potential between the anodic metal 11 and the cathode 13. The switch 17 next connects the line 18 through a terminal 17B to the line 22 to the anodic metal 11, electrically connecting the metal with the cathode 13 externally of the electrolyte bath 12. The switch 17 is operated cyclically between these two positions, alternating short pulses of constant potential with short periods of short circuiting between the anodic metal 11 and the cathode 13 externally of the electrolyte 12. This short circuiting quickly brings the metal 11 and the cathode 13 to the same potential level causing a large power surge to occur when the next short pulse of constant potential is applied.

A final phase of the process consists of a continuous application of a constant potential difference across the anodic metal and the cathode. Operation of the switch 17 by deenergizing the timer 23 or by hand so as to connect the line 18 continuously to the negative terminal of the constant voltage source 16 will supply the necessary constant potential difference. The duration of this final phase of treatment may be from several minutes to several hours. The constant voltage applied may be equal in magnitude to that applied during the constant voltage period prior to the pulsing phase of the process. This final phase of continuous application of forming voltage ensures that the desired capacitance value is developed and that a continuous, hole-free film of low direct current leakage value is formed.

A specific example of the process, set forth below, has been successfully practiced to form a tantalum pentoxide film of high quality on the tantalum anodes. These anodes were used in the manufacture of 40 microfarad, 20 rated volts, solid electrolyte capacitors. The actual process used was as follows:

An electrolyte of 0.5% concentrated nitric acid of Reagent Grade by volume in distilled water, maintained at 68°±2° C., was used. Any change in volume of the electrolyte bath due to evaporation was countered by addition of distilled water. The electrolyte bath was continually agitated during the process. The agitation aided in maintaining the bath temperature constant at ambient room temperature throughout the process and prevented any temperature build-up at the anode. In addition, agitation functioned to bring fresh electrolyte to the anode during anodization.

A plurality of raw, porous tantalum anodes were simultaneously treated, the anodes being welded to common tantalum wire, as shown in the figure. A cathode of tantalum metal, previously oxidized to tantalum pentoxide to prevent rapid deterioration in the electrolyte, was used. The tantalum pentoxide protection keeps the cathode from becoming brittle due to the migration to the cathode of hydrogen gas which is dissociated during the anodization. The tantalum anodes and the cathode were immersed and supported in the electrolyte bath.

A direct current of 2160 ma. was then applied across the tantalum anodes and the cathode. A circuit of the type shown in the drawing was used for carrying out this and the subsequent phases of the process. The applied potential increased linearly with the time as the oxide film thickness increased, until a level of 58 volts was attained. This first phase of direct current application at constant amperage lasted for approximately ten minutes.

Next, the potential difference across the anodes and the cathode was maintained at a constant 58 volt level. The 58 volt value was selected in order to produce a capacitor having the desired 40 microfarad final capacitance. The application of constant potential was continued for one half hour. It is believed that during this time, sufficient to form approximately 75% of the desired final film thickness, a significant number of regions of impurities were built up in the tantalum pentoxide film being formed on the tantalum anodes. These impurities are believed to have included oxides of iron, copper, and/or aluminum. Such impurities are of lower resistivity than the surrounding pure areas of tantalum pentoxide.

After the half hour period of constant voltage application, a pulsing phase was begun, in order to burn out the aforementioned impurities. The pulsing phase was also used to rid the surface of oxygen bubbles and to eliminate any trapped pockets of oxygen which tend to cause reduced film thickness. Such reduced film thickness might result in an electrical breakdown of the capacitor at its rated potential, rendering it incapable of performing its intended function. Intermittent pulses of 58 volts potential difference were applied, each pulse having a duration of one second. Interspersed between the pulses were periods of zero potential difference lasting for one second each. The one second on and one second off pulsing cycle was repeated for one hour total pulsing time. It is believed that during each short pulse of 58 volts potential difference the current tended to flow through the impurity regions of the film, these constituting the path of least resistance thereto, thereby concentrating the energy application into small areas. The short periodic surges of current tended to electrically burn out these impurities by applying an extremely large value of energy per unit area thereto, thereby permitting the subsequent formation of tantalum pentoxide film of acceptable purity in these regions. The short periods of zero potential difference permitted oxygen bubbles, which form on the tantalum anodes during current application, to be redissolved into the electrolyte solution. It is believed that the intermittent 58 volt pulses also tended to blow off or burst bubbles still remaining on the anodes. Oxygen bubble inclusion in the finished film, which would reduce the film thickness, was substantially avoided.

After one hour of pulsing, there followed a constant potential phase. Again, a 58 volt potential was maintained across the anodes and the cathode. The application of constant voltage was continued for three hours. A final build-up of tantalum pentoxide film substantially free from impurities occurred during this time period. Since oxygen bubbles tend to appear only during the initial stages thereof, no bubble inclusion problem was encountered during the final constant potential phase. The total forming time for the various phases of the process was selected to produce 40 microfarad capacitors having low direct current leakage values.

The tantalum anodes formed by this process were found to have tantalum pentoxide films of high purity and uniformity. The capacitors in which these anodes were used displayed exceptionally low leakage currents in tests both at ambient temperatures and at accelerated life conditions for 11,000 hours at 150°±1° at 20 rated volts. Similar capacitors formed by conventional prior art techniques revealed leakage currents 40 to 60 times as great as those existing in capacitors formed by the method of the present invention.

It is to be understood that the above-described apparatus and method are intended to simply illustrate the method and principles of the invention. Many modifications may be made without departing from the invention.

What is claimed is:

1. In a method of producing a dielectric oxide film on the surface of a film-forming metal which includes a first step of applying a direct current of constant amperage at continuously increasing voltage between the metal as anode and a cathode electrode in an electrolyte solution and a second step of thereafter applying a potential of the same polarity and constant voltage therebetween, the improvement which comprises the steps of:
   intermittently applying pulses of constant potential between said metal as anode and said cathode electrode after said second step;
   intermittentely directly electrically connecting said metal to said electrode externally of said electrolyte solution between said intermittent pulses of constant potential application; and then
   reapplying said constant potential of the same polarity between said metal and said electrode to form on said metal a dielectric oxide film substantially free from impurities.

2. A method of producing a dielectric oxide film on the surface of a film-forming metal, as set forth in claim 1, wherein said steps of intermittently applying pulses of constant potential and of intermittentely directly electrically connecting said metal to said electrode externally of said electrolyte solution comprise repeatedly first:
   applying pulses of constant potential between said metal as anode and said cathode electrode for a time period of from a fraction of a second to several seconds; and, theraffter
   directly electrically connecting said metal to said electrode externally of said electrolyte solution for a time period of from a fraction of a second to several seconds.

3. A method of anodizing a metal, comprising the steps of:
   applying between said metal and a cathode submerged in an electrolyte a direct current of constant amperage at continuously increasing voltage to render said metal anodic with respect to said cathode to initiate anodization of said metal to form an anodized film; then
   applying a potential of constant voltage between said metal and said cathode to further anodize said metal to further form said anodized film; next
   intermittently applying current pulses of constant voltage between said metal and said cathode to burn out impurities in said anodized film, said pulses being interspersed with intermittent periods of zero potential difference; and then
   applying a potential of constant voltage between said metal and said cathode.

4. In a method of anodizing a metal, as set forth in claim 3:
   applying said intermittent pulses of constant voltage each for substantially one second in duration with substantially one second long periods of zero potential difference interspersed therebetween.

5. An electrode for an electrolytic capacitor comprising a mass of film-forming metal and a dielectric oxide film on the surface thereof, said dielectric oxide film being the in situ electroformed product of anodizing said mass as recited in claim 4.

6. In a method of electrochemically forming a dielectric film on tantalum in an electrolyte bath in the presence of a cathode, the sequential steps of:
   (a) applying a direct current of constant amperage at continuously increasing voltage between said tantalum and said cathode to initiate formation of the dielectric film;
   (b) applying a potential of constant voltage between said metal and said cathode to further form the dielectric film;
   (c) terminating application of said potential and directly electrically connecting said metal with said cathode externally of said electrolyte solution for a time period of substantially one second to discharge any residual charge on said cathode;
   (d) applying a current pulse of constant voltage between said metal and said cathode for a time period of substantially one second to burn out impurities in said dielectric film and remove any gaseous bubbles formed on or in said dielectric film;
   (e) alternately repeating first step (c) and then step (d) a plurality of times; and
   (f) repeating step (b) for a time period substantially greater than one second.

7. In a method for forming a pentoxide dielectric film on a pellet of tantalum,
   immersing the pellet in a mild electrolytic solution of nitric acid and water,
   applying current through a cathode of oxidized tantalum and the electrolyte to the pellet to initiate a formation of oxide film,
   continuing the application of current across the pellet and cathode until the voltage reaches a predetermined value,
   maintaining the voltage constant at its predetermined value for a predetermined time to further form the oxide film,
   intermittently interrupting and restoring the application of voltage for predetermined time periods, said predetermined periods of time being selected to be only of sufficient duration to impress current pulses on said pellet for burning out impurities and to redissolve bubbles included in or deposited on the film, directly electrically connecting the pellet and the cathode during the intervals that the applied voltage is interrupted, and then subjecting said pellet and cathode to a constant voltage for a period of time to further build up the dielectric oxide film to a desired value.

8. An electrode for an electrolytic capacitor comprising a mass of tantalum having a pentoxide dielectric film thereon, said pentoxide dielectric film being the in situ electroformed product of the method of claim 7.

References Cited

UNITED STATES PATENTS

| 2,151,806 | 3/1939 | Schnoll et al. | 317—230 |
| 2,920,018 | 1/1960 | Miller | 204—56 |
| 3,254,014 | 5/1960 | Daddona | 204—56 |
| 3,282,821 | 11/1966 | Cistola | 204—228 |
| 3,341,444 | 9/1967 | Chapelle | 204—228 |
| 3,341,445 | 9/1967 | Gerhard | 204—228 |

JAMES D. KALLAM, Primary Examiner

U.S. Cl. X.R.

204—3, 58